(12) United States Patent
Horii

(10) Patent No.: US 6,496,209 B2
(45) Date of Patent: *Dec. 17, 2002

(54) STATUS DISPLAY UNIT USING ICONS AND METHOD THEREFOR

(75) Inventor: Hitoshi Horii, Tokyo (JP)

(73) Assignee: Mitsubishi Denki Kabushiki Kaisha, Chiyoda-Ku (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/368,577
(22) Filed: Aug. 5, 1999

(65) Prior Publication Data
US 2002/0140725 A1 Oct. 3, 2002

(30) Foreign Application Priority Data
Mar. 26, 1999 (JP) .......................... 11-083052

(51) Int. Cl.⁷ ................................ G06F 3/00
(52) U.S. Cl. ............... 345/853; 345/734; 345/772; 345/835; 345/837; 345/736; 345/854; 345/855
(58) Field of Search ............... 345/771, 772, 345/734, 835, 837, 839, 853, 854, 855, 804, 805, 966, 969, 970, 736, 737, 738, 440; 709/223, 224

(56) References Cited

U.S. PATENT DOCUMENTS

| | | | |
|---|---|---|---|
| 5,452,415 A | * | 9/1995 | Hotka .................. 395/161 |
| 5,751,931 A | * | 5/1998 | Cox et al. ............... 395/140 |
| 5,751,965 A | * | 5/1998 | Mayo et al. ............. 345/733 |
| 5,768,119 A | * | 6/1998 | Havekost et al. ........ 364/133 |
| 5,859,885 A | * | 1/1999 | Rusnica et al. .......... 376/259 |
| 5,877,766 A | * | 3/1999 | Bates et al. ............. 345/854 |
| 5,953,010 A | * | 9/1999 | Kampe et al. ........... 345/835 |
| 6,040,834 A | * | 3/2000 | Jain et al. ............... 345/853 |
| 6,219,046 B1 | * | 4/2001 | Thomas et al. ......... 345/705 |
| 6,219,050 B1 | * | 4/2001 | Schaffer ................. 345/781 |
| 6,243,091 B1 | * | 6/2001 | Berstis .................. 345/839 |

FOREIGN PATENT DOCUMENTS

| | | | |
|---|---|---|---|
| JP | 8-115199 | 5/1996 | ............ G06F/3/14 |
| JP | 10-227646 | 8/1998 | ........... G01C/21/00 |

* cited by examiner

Primary Examiner—Raymond J. Bayerl
Assistant Examiner—Cuong T. Thai
(74) Attorney, Agent, or Firm—Burns, Doane, Swecker & Mathis, LLP

(57) ABSTRACT

When an abnormality detecting means 41 has detected an abnormal state of a system, an abnormal position determining means 42 determines the abnormal position in accordance with the received total address. Then, an degree-of-importance determining means determines whether or not a degree of importance exists. If the degree of importance exists, a process is performed in accordance with the degree of importance. An icon display means 45 displays a plurality of icons. A link-line display means 46 displays a link line indicating the connection between the icons. An abnormal-state alarm output means 44 determines the status to change the display in accordance with the contents of the status so as to display the changed display. The actual display is performed by a display means 48. If necessary, output to an alarm sound producing means 49 is performed.

12 Claims, 9 Drawing Sheets

FIG. 7

| SHAPE OF LINK LINE | EXPRESSION 1 | EXPRESSION 2 |
|---|---|---|
| DIFFERENT EXPRESSION USING SHAPE, SIZE, COLOR AND DIMENSION (THREE-DIMENSIONAL SHAPE/PLANE) EXPRESSION 1 = STRONG RELATIONSHIP EXPRESSION 2 = WEAK RELATIONSHIP | i1 → i2 | i1 → i2 |
| EXPRESSION USING FLASHING OF LINK LINE OR ANIMATION | i1 → i2 | |
| EXPRESSION USING PERIPHERAL DECORATION SYMBOLS | i1 —○→ i2 | |

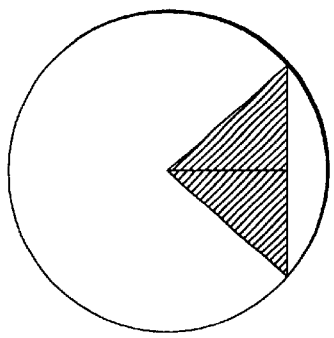 FIG. 9A STATUS 1
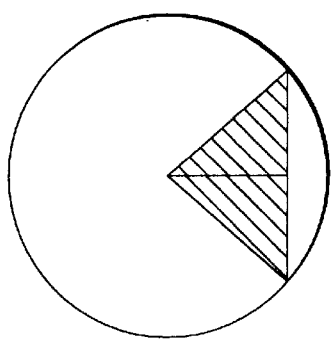 FIG. 9B STATUS 2
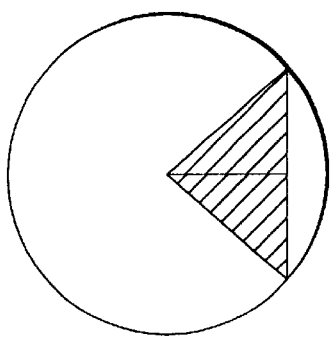 FIG. 9C STATUS 3
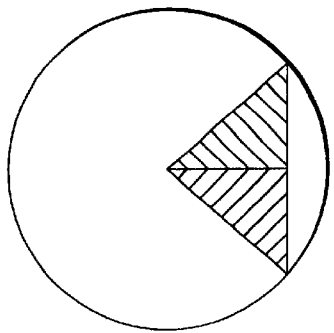 FIG. 9D STATUS 4
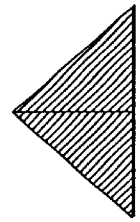 FIG. 9E STATUS 5
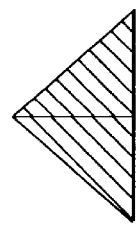 FIG. 9F STATUS 6
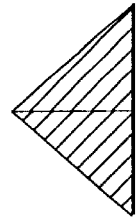 FIG. 9G STATUS 7

STATUS DISPLAY UNIT USING ICONS AND METHOD THEREFOR

BACKGROUND OF THE INVENTION

1. Field of the Invention

The present invention relates to a status display unit using icons for expressing changes of a variety of apparatuses among a plurality of statuses by using real-time change in the colors and shapes of icons and/or indicating relationship by using connection lines (hereinafter sometimes called "link lines") between icons and a method therefor.

2. Description of the Related Art

A method using icons for operating application software has widely been used. For example, a method relating to display of icons has been disclosed in Japanese Patent Laid-Open No. 10-227646. FIGS. 9A to 9G show examples of icons for use in the foregoing conventional structure. The foregoing conventional structure is able to express the states of a plurality of parameters by using change in the color, the expression dimensions of planes or three-dimensional shapes or the presence or absence of peripheral decoration symbols. The disclosed structure is applied to a car navigation system. In this case, a positioning operation is performed which is a combination of the GPS navigation system for receiving an electric wave emitted from a satellite to measure the position of the vehicle and an autonomous navigation system for measuring the position of the vehicle. Then, the statuses of the positioning means based on the GPS navigation system and the positioning means based on the autonomous navigation system are classified into seven statuses below:

(1) two means are normal and the two means are being operated (status 1);

(2) two means are normal and only the positioning means based on the GPS navigation system is being operated (status 2);

(3) two means are normal and only the positioning means based on the autonomous navigation system is being operated (status 3);

(4) two means are normal and the two means are not being operated (status 4);

(5) the positioning means based on the autonomous navigation system is abnormal and only the positioning means based on the GPS navigation system is being operated (status 5);

(6) the positioning means based on the GPS navigation system is abnormal and only the positioning means based on the autonomous navigation system is being operated (status 6); and (7) the two means are abnormal and the two means are not being operated (status 7).

Therefore, the state of the operation and whether or not each means is abnormal can easily be recognized by the user by observing the displayed screen shown in FIGS. 9A to 9G. The display is performed by using change in the color of the mark of the vehicle, the number of expression dimensions of planes or three-dimensional shapes and the presence or absence of peripheral decoration symbols (for example, a frame enclosed by a circle).

The conventional display of the status using the icon has been performed as described above. The conventional example simply relates to the method of expression of the icon. Therefore, a range which can be expressed is limited and thus there arises a problem in that a complicated state of the operation cannot easily be expressed.

There arises another problem in that the hierarchical relationship such as the parenthood and change in the status of the relationship among units belonging to a group having a given meaning of the relationship cannot be expressed.

SUMMARY OF THE INVENTION

To solve the above-mentioned problems, an object of the present invention is to provide an apparatus which enables a user to easily recognize real-time change in the status by using change in the shape and the color of a plurality of icons, presence or absence of peripheral decoration symbols and change in the expression of the relationship among the icons and a method therefor.

A status display unit using icons according to a first aspect of the present invention is a status display unit using icons for displaying the status of a subject to be displayed by using icons or link lines each of which connects icons to each other, the status display unit using icons comprising: icon display means for displaying the icons; link line display means for displaying the link lines; status display means for changing display of a plurality of icons or link lines in accordance with the contents of the subject to be displayed so as to display the changed icons or link lines, wherein expression forms of the plural icons are changed to display the status.

A status display unit using icons according to a second aspect of the present invention is a status display unit using icons for use in a network supervisory apparatus, comprising: abnormal-state detecting means for detecting an abnormal state of the network; abnormal-position determining means for determining an abnormal position; icon display means for displaying icons; link-line displaying means for displaying link lines indicating the connection between icons; and abnormal-state displaying means for changing and displaying display of the icons or the link lines in accordance with the contents of the status of the network, wherein expression forms of the plural icons are changed to display the status.

A status display unit using icons according to a third aspect of the present invention has a structure that the expression forms of the plural icons are changed by changing the colors of the icons.

A status display unit using icons according to a fourth aspect of the present invention has a structure that the expression forms of the plural icons are changed by changing the number of expression dimensions of planes or three-dimensional shapes.

A status display unit using icons according to a fifth aspect of the present invention has a structure that the expression forms of the plural icons are changed by changing the presence or absence of peripheral decoration symbols.

A status display unit using icons according to a sixth aspect of the present invention is a status display unit using icons for displaying the status of a subject be displayed by using icons or link lines each of which connects icons to each other, the status display unit using icons comprising: icon display means for displaying the icons; link line display means for displaying the link lines; status display means for changing display of a plurality of icons or link lines in accordance with the contents of the subject to be displayed so as to display the changed icons or link lines, wherein expression forms of the link line are changed to display the status.

A status display unit using icons according to a seventh aspect of the present invention is a status display unit using icons for use in a network supervisory apparatus, comprising: abnormal-state detecting means for detecting an abnormal state of the network; abnormal-position determining means for determining an abnormal position; icon display means for displaying icons; link-line displaying means for displaying link lines indicating the connection between icons; and abnormal-state displaying means for changing and displaying display of the icons or the link lines in accordance with the contents of the status of the network, wherein expression forms of the link line are changed to display the status.

A status display unit using icons according to an eighth aspect of the present invention has a structure that expression forms of the link lines for connecting the icons to each other are changed by changing the colors of the link lines.

A status display unit using icons according to a ninth aspect of the present invention has a structure that expression forms of the link lines for connecting the icons to each other are changed by changing the number of expression dimensions of planes or three-dimensional shapes.

A status display unit using icons according to a tenth aspect of the present invention has a structure that expression forms of the link lines for connecting the icons to each other are changed by changing the presence or absence of peripheral decoration symbols.

A status display unit using icons according to an eleventh aspect of the present invention is a status display unit using icons for displaying the status of a subject to be displayed by using icons or link lines each of which connects icons to each other, the status display unit using icons comprising: icon display means for displaying the icons; link line display means for displaying the link lines; status display means for changing display of a plurality of icons or link lines in accordance with the contents of the subject to be displayed so as to display the changed icons or link lines, wherein expression forms of the plural icons and link lines are changed to display the status.

A status display unit using icons according to a twelfth aspect of the present invention is a status display unit using icons for use in a network supervisory apparatus, comprising: abnormal-state detecting means for detecting an abnormal state of the network; abnormal-position determining means for determining an abnormal position; icon display means for displaying icons; link-line displaying means for displaying link lines indicating the connection between icons; and abnormal-state displaying means for changing and displaying display of the icons or the link lines in accordance with the contents of the status of the network, wherein expression forms of the plural icons and link lines are changed to display the status.

A status display unit using icons according to a thirteenth aspect of the present invention has a structure that expression forms of the plural icons and link lines between the icons are changed by changing the colors of the icons and link lines.

A status display unit using icons according to a fourteenth aspect of the present invention has a structure that expression forms of the plural icons and link lines between the icons are changed by changing the number of expression dimensions of planes or three-dimensional shapes.

A status display unit using icons according to a fifteenth aspect of the present invention has a structure that expression forms of the plural icons and link lines between the icons are changed by changing the presence or absence of peripheral decoration symbols.

A status display method using icons according to a sixteenth aspect of the present invention is a status display method using icons such that the status of a subject to be displayed is displayed by using icons or link lines each of which connects icons to each other, the status display method comprising: an icon display step for displaying the icons; a link line display step for displaying the link lines; a status display step for changing display of a plurality of icons or link lines in accordance with the contents of the subject to be displayed so as to display the changed icons or link lines, wherein expression forms of the plural icons are changed to display the status.

A status display method using icons according to seventeenth aspect of the present invention is used in a network supervisory apparatus, comprising: an abnormal-state detecting step for detecting an abnormal state of the network; an abnormal-position determining step for determining an abnormal position; an icon display step for displaying icons; a link-line displaying step for displaying link lines indicating the connection between icons; and an abnormal-state displaying step for changing and displaying display of the icons or the link lines in accordance with the contents of the status of the network, wherein expression forms of the plural icons are changed to display the status.

A status display method using icons according to an eighteenth aspect of the present invention has a structure that the expression forms of the plural icons are changed by changing the colors of the icons.

A status display method using icons according to a nineteenth aspect of the present invention has a structure that the expression forms of the plural icons are changed by changing the number of expression dimensions of planes or three-dimensional shapes.

A status display method using icons according to a twentieth aspect of the present invention has a structure that the expression forms of the plural icons are changed by changing the presence or absence of peripheral decoration symbols.

A status display method using icons according to a twenty-first aspect of the present invention is a status display method using icons such that the status of a subject to be displayed is displayed by using icons or link lines each of which connects icons to each other, the status display method comprising: an icon display step for displaying the icons; a link line display step for displaying the link lines; a status display step for changing display of a plurality of icons or link lines in accordance with the contents of the subject to be displayed so as to display the changed icons or link lines, wherein expression forms of the link lines are changed to display the status.

A status display method using icons according to a twenty-second aspect of the present invention is a status display method using icons for use in a network supervisory apparatus, comprising: an abnormal-state detecting step for detecting an abnormal state of the network; an abnormal-position determining step for determining an abnormal position; an icon display step for displaying icons; a link-line displaying step for displaying link lines indicating the connection between icons; and an abnormal-state displaying step for changing and displaying display of the icons or the link lines in accordance with the contents of the status of the network, wherein expression forms of the link lines are changed to display the status.

A status display method using icons according to a twenty-third aspect of the present invention has a structure that expression forms of the link lines for connecting the icons to each other are changed by changing the colors of the link lines.

A status display method using icons according to a twenty-fourth aspect of the present invention has a structure that expression forms of the link lines for connecting the icons to each other are changed by changing the number of expression dimensions of planes or three-dimensional shapes.

A status display method using icons according to a twenty-fifth aspect of the present invention has a structure that expression forms of the link lines for connecting the icons to each other are changed by changing the presence or absence of peripheral decoration symbols.

A status display method using icons according to a twenty-sixth aspect of the present invention is a status display method using icons such that the status of a subject to be displayed is displayed by using icons or link lines each of which connects icons to each other, the status display method comprising: an icon display step for displaying the icons; a link line display step for displaying the link lines; a status display step for changing display of a plurality of icons or link lines in accordance with the contents of the subject to be displayed so as to display the changed icons or link lines, wherein expression forms of the plural icons and link lines are changed to display the status.

A status display method using icons according to a twenty-seventh aspect of the present invention is a status display method using icons for use in a network supervisory apparatus, comprising: an abnormal-state detecting step for detecting an abnormal state of the network; an abnormal-position determining step for determining an abnormal position; an icon display step for displaying icons; a link-line displaying step for displaying link lines indicating the connection between icons; and an abnormal-state displaying step for changing and displaying display of the icons or the link lines in accordance with the contents of the status of the network, wherein expression forms of the plural icons and link lines are changed to display the status.

A status display method using icons according to a twenty-eighth aspect of the present invention has a structure that expression forms of the plural icons and link lines between the icons are changed by changing the colors of the icons and link lines.

A status display method using icons according to a twenty-ninth aspect of the present invention has a structure that expression forms of the plural icons and link lines between the icons are changed by changing the number of expression dimensions of planes or three-dimensional shapes.

A status display method using icons according to a thirtieth aspect of the present invention has a structure that expression forms of the plural icons and link lines between the icons are changed by changing the presence or absence of peripheral decoration symbols.

BRIEF DESCRIPTION OF THE DRAWINGS

FIG. 7 is a diagram showing an example of a screen which specifically displays icons and the relationship between the icons;

FIGS. 9A to 9G are diagrams showing examples of icons for use in a conventional structure.

DETAILED DESCRIPTION OF THE PREFERRED EMBODIMENTS

A description will be given in more detail of preferred embodiments of the present invention with reference to the accompanying drawings.

(First Embodiment)

Figure 1:
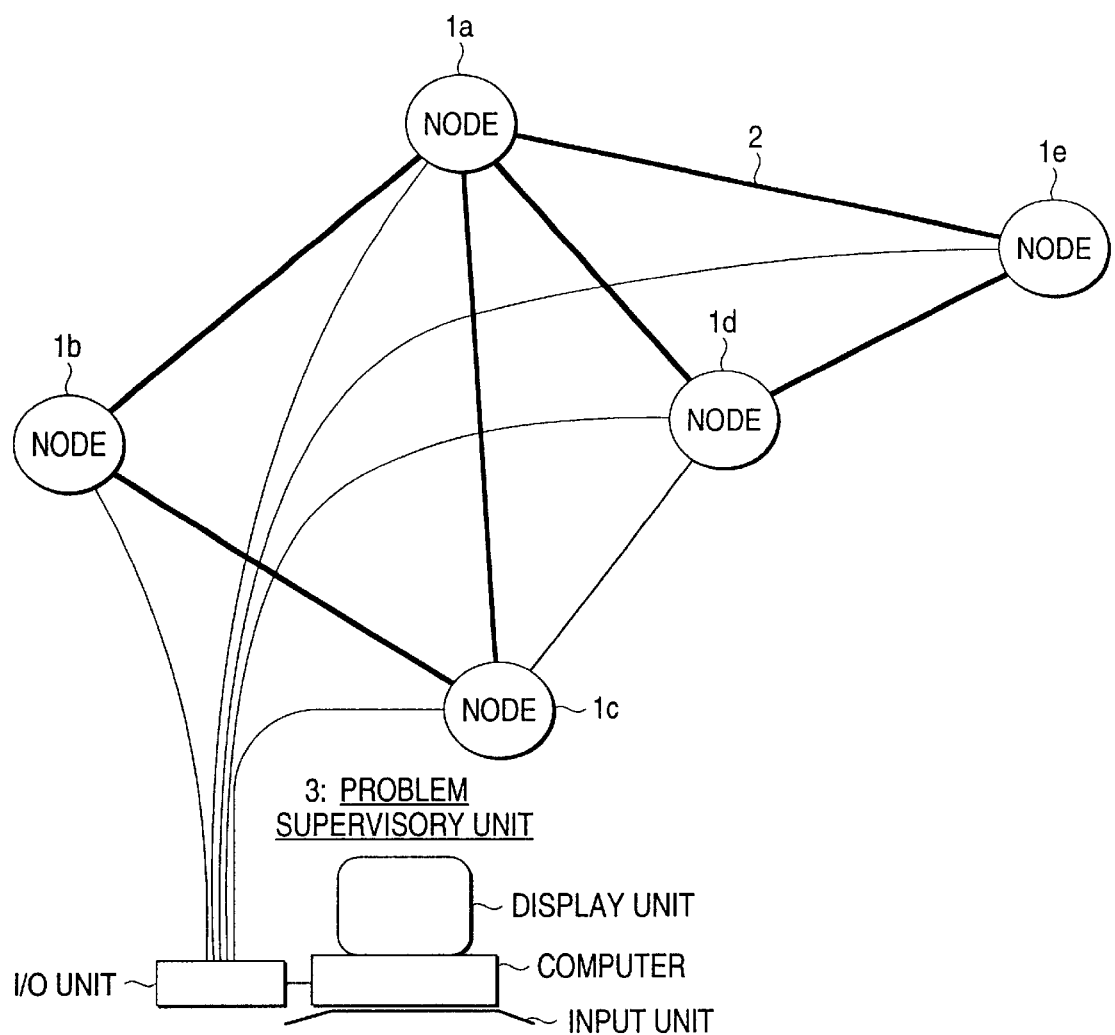
FIG. 1 is a view showing an example of the structure of a network.

FIG. 1 is a schematic view showing an example of the structure of a network. Referring to the drawing, reference numeral 1 represents nodes, 2 represents connection lines for establishing the connection between the nodes, the connection lines corresponding to optical cables for use in a large-size network system. Reference numeral 3 represents a problem supervisory unit for supervising whether or not the network has a problem. The problem supervisory unit 3 is exemplified by a computer incorporating an input unit, an I/O unit and a display unit, as shown in the drawing.

Figure 2:
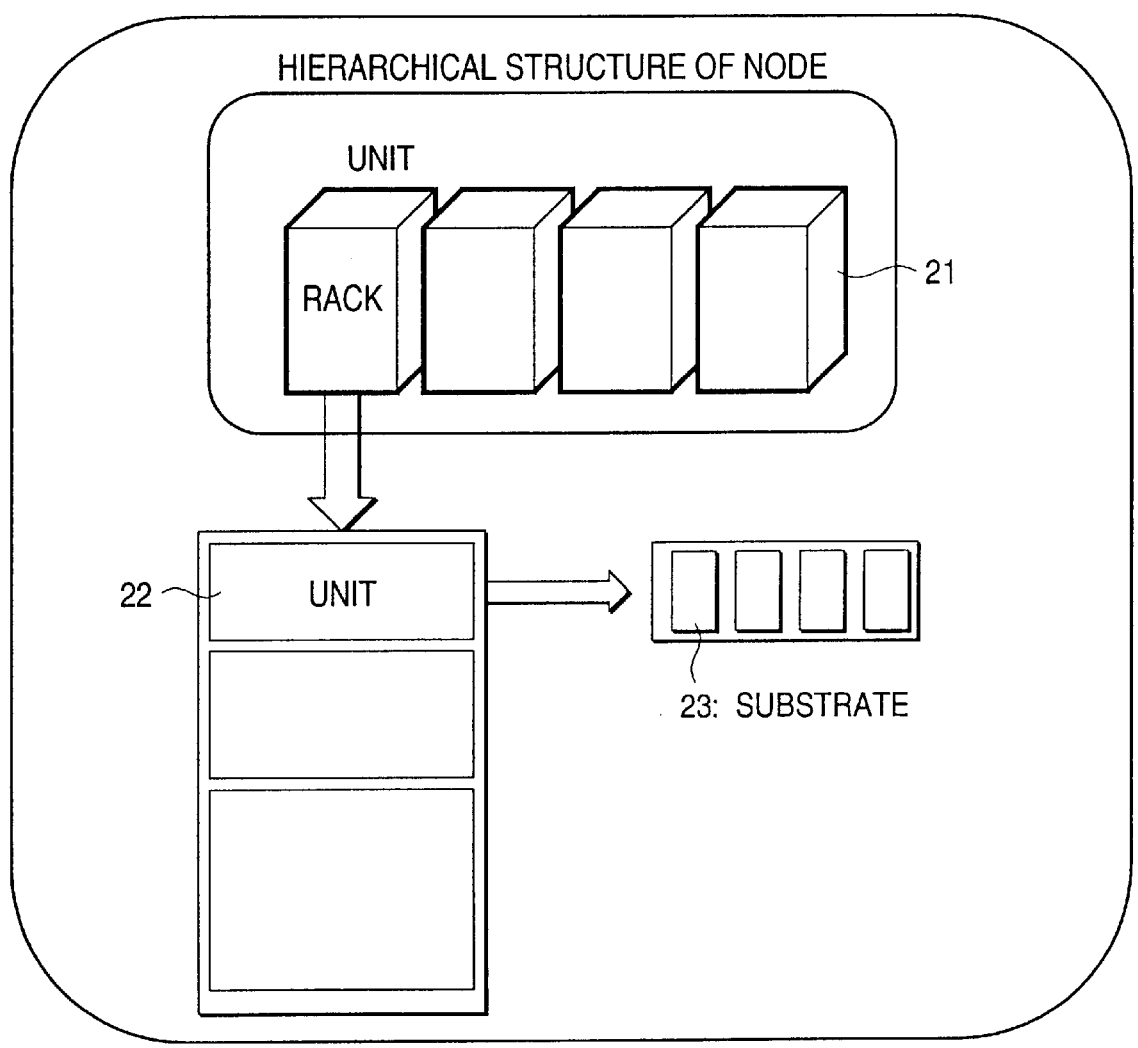
FIG. 2 is a view showing the structure of an example in which one or more racks accommodated in each node shown in FIG. 1 are displayed on a screen.

FIG. 2 is a view showing an example of the structure in which one or more cabinets (hereinafter called "racks") accommodated in each node shown in FIG. 1. Each rack accommodates one or more units. Each unit accommodates one or more circuit substrates (hereinafter simply called "substrates").

Figure 3:
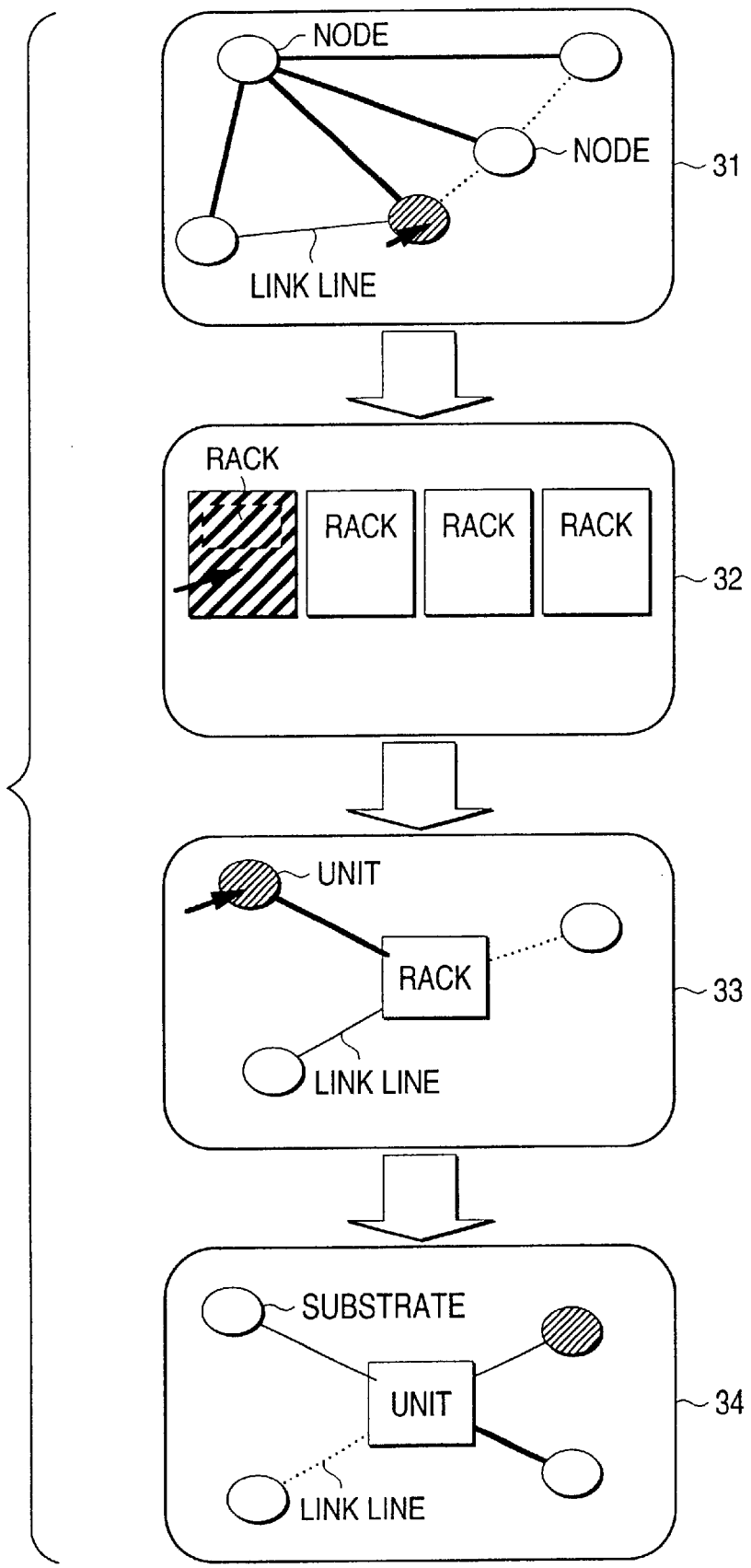
FIG. 3 is a diagram showing an example of a displayed screen of a problem supervisory unit.

FIG. 3 is a diagram showing an example of a display screen of the problem supervisory unit, in which detection of a position of occurrence of a problem in the network is illustrated. In the drawing, supervisory of change in the icons and links between the icons is performed.

The operation of the network supervisory system will now be described.

In the network shown in FIG. 1, an assumption is made that a node address, a rack address, a unit address and a substrate address are previously assigned to each of the nodes, racks, units and the substrates. Moreover, a total address which is the logical sum of the node address, the rack address, the unit address and the substrate address is assigned to be only address in the network.

When a certain substrate (for example, substrated of unit a of rack a of node 1c) in the node 1c connected to the network has encountered an abnormal condition, the node 1c accommodating the foregoing substrate detects an abnormal signal and sequentially reads rack address a, unit address a and substrate address d which have encountered the abnormality. Then, the address 1c of the node is added to the rack address a, unit address a and the substrate address d which has encountered the abnormality so that address "1caad" is produced. The address "1caad" is, together with an abnormal signal and an abnormal status information indicating a type of the abnormality, communicated to the problem supervisory unit 3.

When the problem supervisory unit 3 has detected the abnormal signal and abnormal status information, the problem supervisory unit 3 divides "1caad" into the address 1c of the node encountered the abnormality, the rack address a, the unit address a and the substrate address d to manage the divided addresses. Moreover, the problem supervisory unit 3 stores the abnormal status. In addition, occurrence of the abnormality is alarmed by operating an alarm unit, such as a buzzer and by changing the color of the icon of the node 1*a* displayed on the display unit to, for example, red.

Then, the user stops the sound production from the alarm unit by operating a confirmation button or the like, and then points the icon of the node 1*c* which is indicating the abnormality on the screen by using a pointing device (or by directly touching a touch panel in the case of the touch panel). Thus, the network and icons of all of nodes disappear from the screen. As an alternative to this, icons of the plurality of the racks a to d accommodated in the node 1*c* encountered the abnormality are displayed. Moreover, the color of the icon of the rack a among the foregoing racks encountered the abnormality is changed to red. In addition, the thickness of the link line between the icon of the node 1*c* and that of the rack a is changed to a thick line.

Then, the user uses the pointing device to point the icon of the rack a indicating the abnormality on the screen. Thus, the screen is switched so that the icon of the rack a encountered the abnormality and icons of the plural units a to c accommodated in the foregoing rack are displayed in a state in which the displayed icons are connected to one another with link lines. Moreover, the color of the icon of the unit a among the foregoing units encountered the abnormality is changed to red (a green icon is displayed in a normal state). Moreover, the thickness of the link line between the icon of the rack a and the icon a of the unit a is changed to a thicker line.

Then, when the user has used the pointing device to point the icon of the unit a indicating the abnormality on the screen, the screen is switched. Thus, the icon of the unit a encountered the abnormality and the icons of the plural substrates a to d accommodate in the foregoing unit are displayed such that the displayed icons are connected to one another with the link lines. Moreover, the color of the icon of the substrate d among the displayed substrates which has encountered the abnormality is changed to a color corresponding to each of the contents of the abnormal status (for example, yellow is used in a case of defective connection and red is used in a case of a failure of the circuit) Moreover, the thickness of the link line between the icon of the unit a and that of the substrate d is changed to a thicker line.

The foregoing display of the abnormality is reset when the user depresses a restoring button so that an initial screen (a screen 31 in which icons of all nodes are displayed in green) is again displayed.

The example of the applied system is structured as described above.

Although the foregoing embodiment is arranged such that the color is changed to red, another color may, of course, be employed. Moreover, sound production using the alarm unit may be omitted.

Although the color of the icon is changed in the foregoing embodiment, the present invention is not limited to this. For example, change in the display size of the icon to smaller size and larger size may be repeated. As an alternative to this, the icon may be flashed or the shape of the icon may be changed to another shape. As an alternative to this, the thickness of the frame may be changed.

In this embodiment, the thickness of the link line between the icon is changed. Note that the present invention is not limited to this. For example, the color of the link line may be changed. As an alternative to this, the operation for changing the thickness of the connection line to a larger thickness or smaller thickness may be repeated. As an alternative to this, the connection line may be flashed. As an alternative to this, the shape of the connection line may be changed to another shape (for example, an alternate long and short dash line or a line having black circles or black triangles). As an alternative to this, the thickness of the frame may be changed.

Although the foregoing embodiment employs the network as an example, the present invention is not limited to this. The present invention may be applied to any one of systems and apparatuses to which the spirit of the display of the status using the icon can be applied.

(Second Embodiment)

Figure 4:
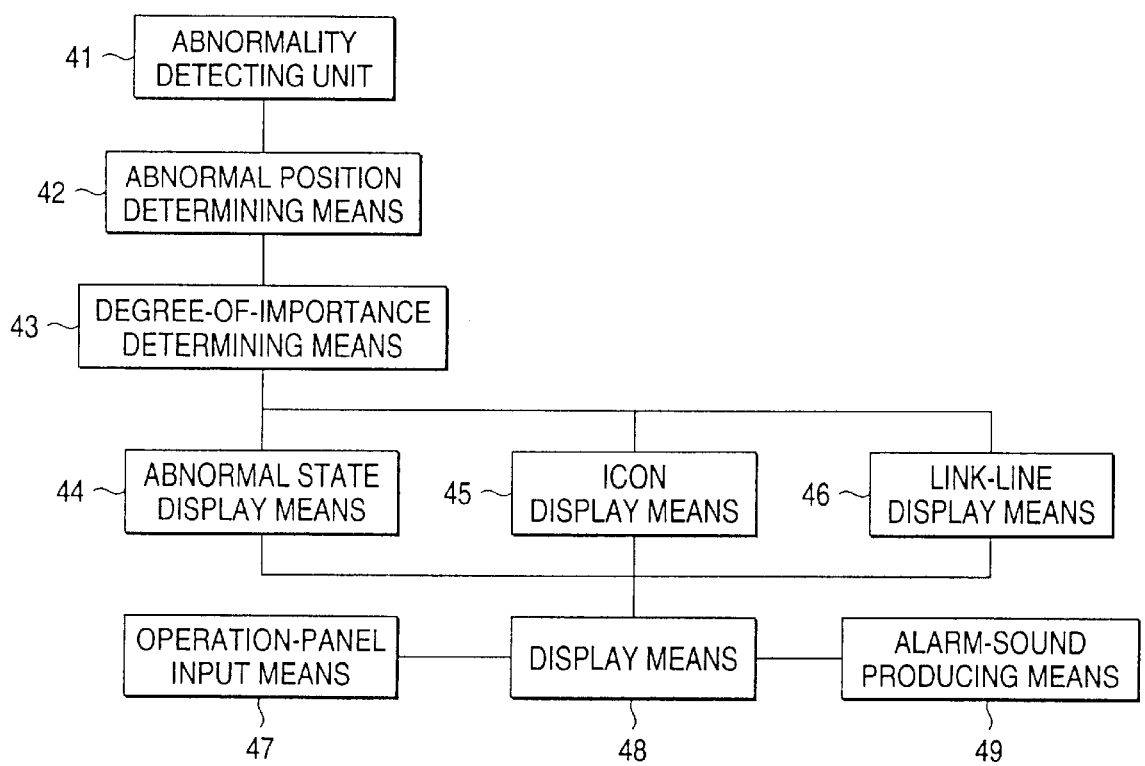
FIG. 4 is a diagram showing an example of the structure for realizing the operation of the problem supervisory unit.

FIG. 4 is a diagram showing an example of the structure for permitting the problem supervisory unit to perform the above-mentioned operation. Referring to FIG. 4, reference numeral 41 represents an abnormality detecting means, 42 represents an abnormal position determining means, 43 represents a degree-of-importance determining means, 44 represents an abnormal-state alarm output means, 45 represents an icon display means, 46 represents a link-line display means, 47 represents an operation-panel input means which accommodates a variety of buttons, 48 represents a display means and 49 represents an alarm sound producing means.

The operation of each means will now be described. Referring to FIG. 4, when the abnormality detecting means 41 has detected the abnormal signal, the abnormality detecting means 41 outputs, to the abnormal position determining means 42, the total address which is the logical sum of the node address, the rack address, the unit address and the substrate address in the portion encountered the abnormality. The abnormal position determining means 42 divides the supplied total address into the node address, the rack address, the unit address and the substrate address to determine the position at which the abnormality has occurred. If a plurality of abnormal states occur simultaneously, the degree-of-importance determining means 43 makes a reference to an included table (not shown) to determine the degree of importance to select the abnormality having a higher degree of importance. The abnormal-state alarm output means 44 uses the abnormal status communicated from the degree-of-importance determining means 43 as a key in a process for retrieving an included abnormal status table (not shown). Thus, the abnormal-state alarm output means 44 decides the corresponding type of the display (for example, display in yellow is selected when the status is "caution" and display in red is selected when the status is "failure"). Simultaneously, the abnormal-state alarm output means 44 instructs the alarm sound producing means 49 to make an output.

Then, the icon display means 45 instructs the display means 48 to display the icon. The link-line display means 46 instructs the display means 48 to connect the icons to each other with the link line. Specifically, the display is performed by using a known development tool for the window. The abnormal-state alarm output means 44 instructs the display means 48 to display the decided color such that the color is superimposed on the icon.

The display means 48 follows the instructions issued from the abnormal-state alarm output means 44, the icon display means 45 and the link-line display means 46 to perform display. The alarm sound producing means 49 follows an instruction issued from the abnormal-state alarm output means 44 to perform the alarming operation. When the user depresses the confirmation button on the operation-panel input means 47, the alarm sound producing means receives the signal to stop producing the sound. When the user has depressed the restoring button on the operation-panel input means 47, the abnormal-state alarm output means 44 cancels the color display of the abnormal state under the condition that the abnormal state has been restored. The icon display means 45 displays the icon of the initial screen. Also the link-line display means 46 displays the link line between the icons on the initial screen.

(Third Embodiment)

Figure 5:
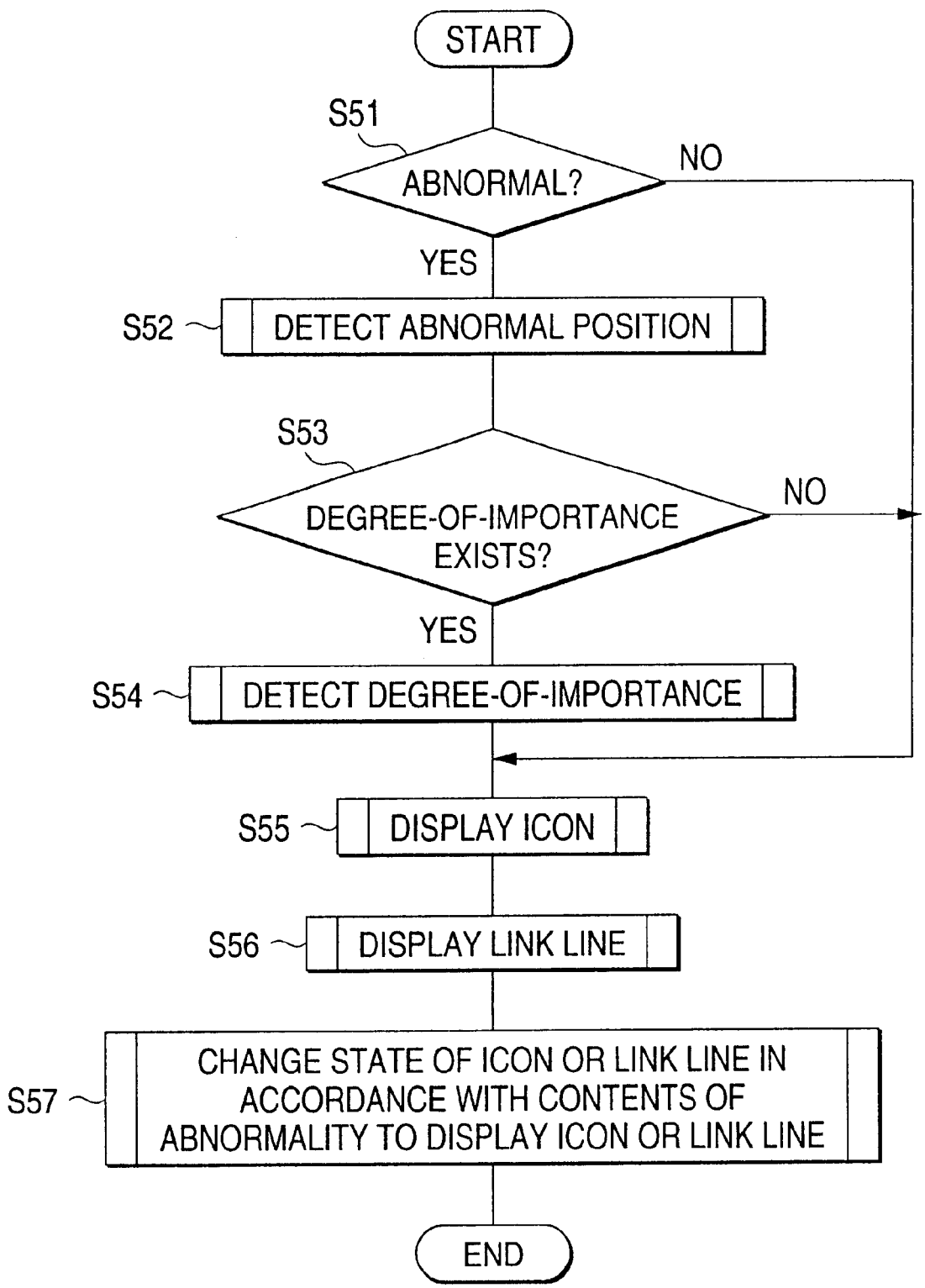
FIG. 5 is a flow chart showing the process which is performed by the problem supervisory unit 3 to realize the operation according to the first embodiment.

FIG. 5 is a flow chart showing the process for realizing the operation of the problem supervisory unit according to the first embodiment.

Referring to FIG. 5, the foregoing process is periodically performed. Note that the foregoing process is sometime started manually, if necessary. If the process has been started, whether or not an abnormal state has occurred is detected (step S51). If no abnormal state is detected, the operation proceeds to step S55. If an abnormal state is detected in step S51, the received total address is divided into the node address, the rack address, the unit address and the substrate address to determine the abnormal position (step S52). Then, existence of the degree of importance is determined to determine whether or not an important abnormal state has occurred (step S53). If the degree of importance does not exist in step S53, the operation proceeds to step S55. If the degree of importance exists, the degree of importance is detected. If two or more abnormal states must simultaneously be overcome, the abnormal state having the higher degree of importance is selected (step S54). Then, the icon is displayed (step S55). Then, the link line for connecting the icons to each other is displayed (step S56). Then, the abnormal status is examined (this process is omitted from illustration) In accordance with the contents of the abnormal state, the state of the icon or the link line is changed and the changed icon or the link line is displayed (step S57).

Figure 6:
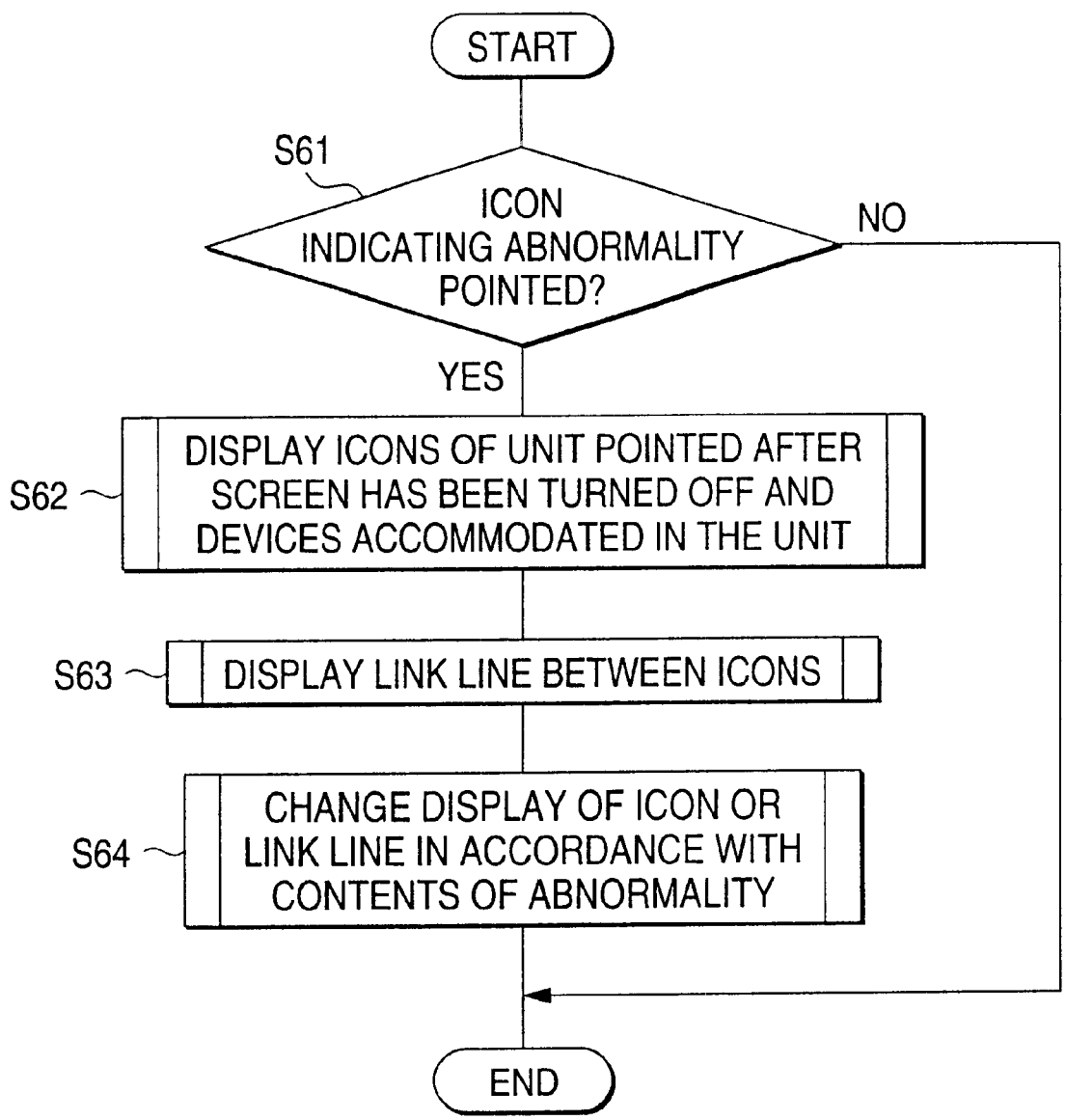
FIG. 6 is a flow chart showing the operation of the problem supervisory unit according to the embodiment which is performed when a user has pointed an icon encountered a problem.

FIG. 6 is a flow chart of the operation of the problem supervisory unit according to this embodiment which is performed when the user has pointed an icon having a problem.

The operation shown in FIG. 6 will now be described.

Referring to FIG. 6, the problem supervisory unit checks whether or not the icon having abnormality has been pointed by the user (step S61). If the pointing operation is not performed, the foregoing process is completed. If the pointing operation is detected in step S61, the screen which is being displayed at present is turned off. Then, the pointed icon of the unit and the icons of units accommodated in the foregoing unit are displayed (step S62). Moreover, the link lines for establishing the connection between icons are displayed (step S63). Then, the abnormal status is examined (this process is omitted from description). In accordance with the contents of the abnormality, the color of the icon or the link line to be displayed is changed (step S64).

(Fourth Embodiment)

FIG. 7 is a diagram showing an example of a screen for specifically displaying icons and the relationship between icons. As shown in the drawing, the expression of the connection line for connecting icons to each other in a case where two icons exist is changed. In an example case shown in the uppermost portion of the drawing, existence or absence of the subordination between the icons and the degree of coupling between the icons are expressed by using the shape, the size and the color of the link line and the different manner of expression using a plane or a three-dimensional shape. Since an arrow in Expression 1 is a thick arrow, a strong degree of coupling is indicated. Since an arrow in Expression 2 is a thin arrow, a weak degree of coupling is indicated.

The intermediate example is arranged to perform expression using flashing of the link line and animation. In the lower case, peripheral symbols of the link line are used to perform the expression.

Figure 8:
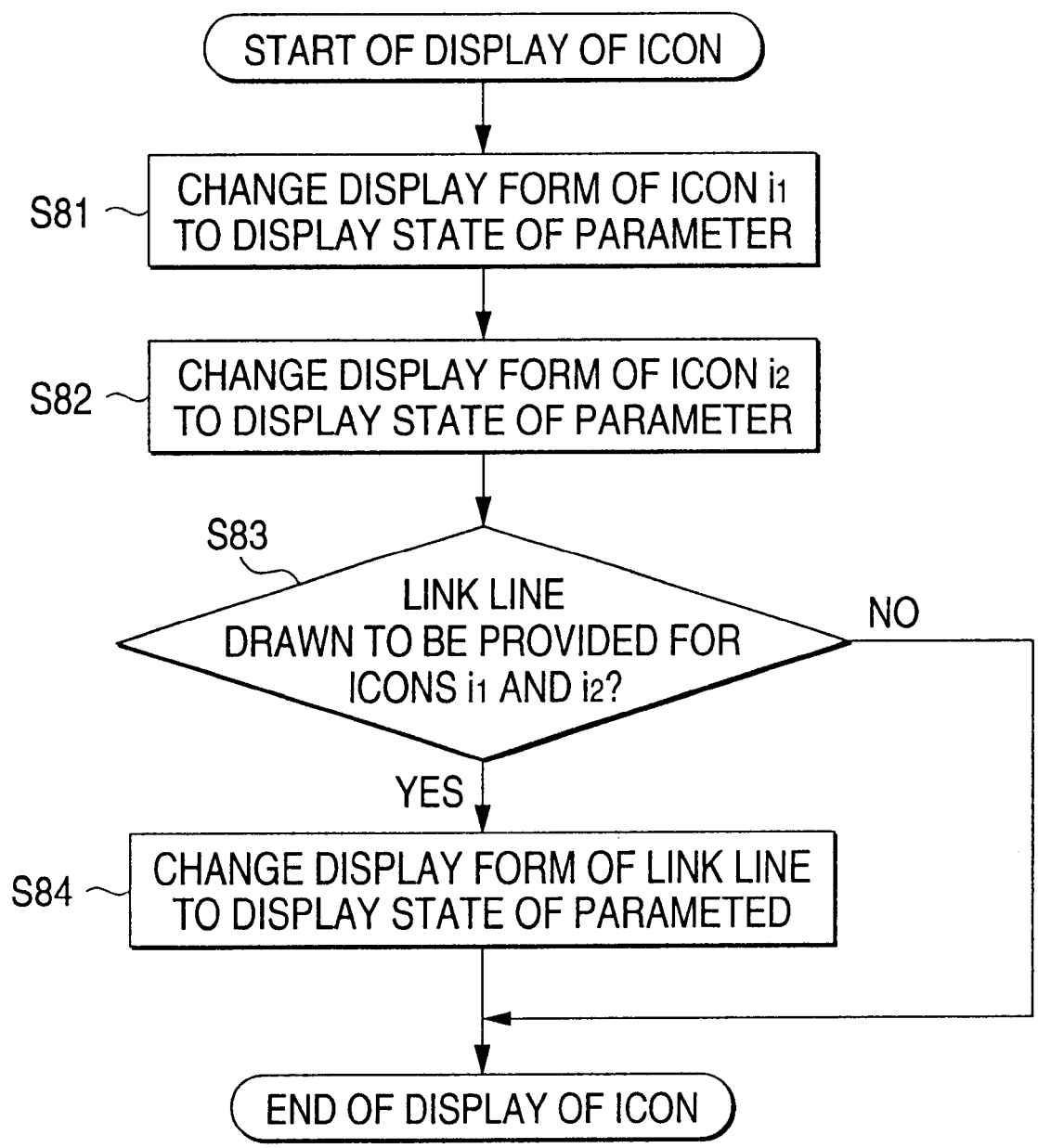
FIG. 8 is a flow chart showing the process for specifically displaying the icons and the relationship between the icons.

FIG. 8 is a flow chart of a process for specifically displaying the icons and the relationship between the icons. The process of the foregoing flow chart will now be described. Referring to FIG. 8, the state of display of icon $I_1$ is changed by using the color, the number of expression dimensions of planes or three-dimensional shapes and peripheral decoration symbols. Thus, the states of a plurality of parameters are displayed (step S81).

Then, the state of display of icon $I_2$ is changed by using the color, the number of expression dimensions of planes or three-dimensional shapes and peripheral decoration symbols. Thus, the states of a plurality of parameters are displayed (step S82).

Then, whether or not the icon $I_1$ and the icon $I_2$ have a relationship is examined (step S83) If the icons $I_1$ and $I_2$ have no relationship, the process is completed. If the relationship exists, the link line between the two icons is displayed (step S84).

Then, the state of display of the link line between the icon $I_1$ and the icon $I_2$ is changed by using the color, the number of expression dimensions of planes or three-dimensional shapes and peripheral decoration symbols. Thus, the states of a plurality of parameters are displayed (step S85).

According to this embodiment, real-time change in the status is visually displayed by using the number of expression dimensions of planes or three-dimensional shapes and peripheral decoration symbols. Therefore, the range in which the icon can be expressed can be enlarged and, therefore, a complicated state of the operation can easily be expressed.

According to this embodiment, the hierarchical relationship such as the parenthood and change in the status of the relationship among units belonging to a group having a given meaning of the relationship can easily be expressed by performing visual display using change in the color and the shape of the connection line for establishing the connection between the icons.

As described above, according to the present invention, real-time change in the status is visually displayed by using the number of expression dimensions of planes or three-dimensional shapes and peripheral decoration symbols. Therefore, an effect can be obtained in that the range in which the icon can be expressed can be enlarged and, therefore, a complicated state of the operation can easily be expressed.

According to the present invention, an effect can be obtained in that the hierarchical relationship such as the parenthood and change in the status of the relationship among units belonging to a group having a given meaning of the relationship can easily be expressed by performing visual display using change in the color and the shape of the connection line for establishing the connection between the icons.

What is claimed is:

1. A status display unit using icons for displaying the status of a subject which is displayed by using icons or link lines each of which connects icons to each other, said status display unit using icons comprising:

icon display means for displaying said icons;

link line display means for displaying said link lines;

degree-of-importance determining means for determining a degree of importance of a contents of the subject; and status display means for changing display of a plurality of icons or link lines in accordance with the degree of importance of the contents of the subject to be displayed so as to display the icons or link lines having a higher degree of importance;

wherein expression forms of the plural icons are changed to display the status.

2. A status display unit using icons for use in a network supervisory apparatus, comprising:

abnormal-state detecting means for detecting an abnormal state of the network;

abnormal-position determining means for determining an abnormal position;

degree-of-importance determining means for determining a degree of importance of a contents of the status of the network;

icon display means for displaying icons;

link-line displaying means for displaying link lines indicating the connection between icons; and abnormal-state displaying means for changing and displaying a higher degree of importance of the icons or the link lines in accordance with the degree of importance of the contents of the status of the network;

wherein expression forms of the plural icons are changed to display the status.

3. A status display unit using icons for displaying the status of a subject to be displayed by using icons or link lines each of which connects icons to each other, said status display unit using icons comprising:

icon display means for displaying said icons;

link line display means for displaying said link lines;

degree-of-importance determining means for determining a degree of importance of a contents of the subject; and status display means for changing display of a plurality of icons or link lines in accordance with the degree of importance of the contents of the subject to be displayed so as to display the icons or link lines having a higher degree of importance;

wherein expression forms of the link line are changed to display the status.

4. A status display unit using icons for use in a network supervisory apparatus, comprising:

abnormal-state detecting means for detecting an abnormal state of the network;

abnormal-position determining means for determining an abnormal position;

degree-of-importance determining means for determining a degree of importance of a contents of the status of the network;

icon display means for displaying icons;

link-line displaying means for displaying link lines indicating the connection between icons; and abnormal-state displaying means for changing and displaying a higher degree of importance of the icons or the link lines in accordance with the degree of importance of the contents of the status of the network, wherein expression forms of the link line are changed to display the status.

5. A status display unit using icons for displaying the status of a subject to be displayed by using icons or link lines each of which connects icons to each other, said status display unit using icons comprising:

icon display means for displaying said icons;

link line display means for displaying said link lines;

degree-of-importance determining means for determining a degree of importance of a contents of the subject; and status display means for changing display of a plurality of icons or link lines in accordance with the degree of importance of the contents of the subject to be displayed so as to display the icons or link lines having a higher degree of importance;

wherein expression forms of the plural icons and link lines are changed to display the status.

6. A status display unit using icons for use in a network supervisory apparatus, comprising:

abnormal-state detecting means for detecting an abnormal state of the network;

abnormal-position determining means for determining an abnormal position;

degree-of-importance determining means for determining a degree of importance of a contents of the status of the network;

icon display means for displaying icons;

link-line displaying means for displaying link lines indicating the connection between icons; and abnormal-state displaying means for changing and displaying a higher degree of importance of the icons or the link lines in accordance with the degree of importance of the contents of the status of the network;

wherein expression forms of the plural icons and link lines are changed to display the status.

7. A status display method using icons such that the status of a subject to be displayed is displayed by using icons or link lines each of which connects icons to each other, said status display method comprising the steps of:

displaying the icons;

displaying said link lines;

determining a degree of importance of a contents of the subject; and changing display of a plurality of icons or link lines in accordance with the degree of importance of the contents of the subject to be displayed so as to display the icons or link lines having a higher degree of importance;

wherein expression forms of the plural icons are changed to display the status.

8. A status display method using icons for use in a network supervisory apparatus, said method comprising the steps of:

detecting an abnormal state of the network;

an abnormal-position determining step for determining an abnormal position;

determining a degree of importance of a contents of the status;

displaying icons;

displaying link lines indicating the connection between icons; and changing and displaying a higher degree of importance of the icons or the link lines in accordance with the degree of importance of the contents of the status of the network;

wherein expression forms of the plural icons are changed to display the status.

9. A status display method using icons such that the status of a subject to be displayed is displayed by using icons or link lines each of which connects icons to each other, said status display method comprising the steps of:

displaying the icons;

displaying said link lines;

determining a degree of importance of a contents of the subject; and changing display of a plurality of icons or link lines in accordance with the degree of importance of the contents of the subject to be displayed so as to display the icons or link lines having a higher degree of importance;

wherein expression forms of the link lines are changed to display the status.

10. A status display method using icons for use in a network supervisory apparatus, said method comprising the steps of:

detecting an abnormal state of the network;

an abnormal-position determining step for determining an abnormal position;

determining a degree of importance of a contents of the status;

displaying icons;

displaying link lines indicating the connection between icons; and changing and displaying a higher degree of importance of the icons or the link lines in accordance with the degree of importance of the contents of the status of the network;

wherein expression forms of the link lines are changed to display the status.

11. A status display method using icons such that the status of a subject to be displayed is displayed by using icons or link lines each of which connects icons to each other, said status display method comprising the steps of:

determining a degree of importance of a contents of the subject;

displaying the icons;

displaying said link lines;

changing display of a plurality of icons or link lines in accordance with the degree of importance of the contents of the subject to be displayed so as to display the icons or link lines having a higher degree of importance;

wherein expression forms of the plural icons and link lines are changed to display the status.

12. A status display method using icons for use in a network supervisory apparatus, said method comprising:

detecting an abnormal state of the network;

determining an abnormal position;

determining a degree of importance of a contents of the status;

displaying icons;

displaying link lines indicating the connection between icons; and changing and displaying a higher degree of importance of the icons or the link lines in accordance with the degree of importance of the contents of the status of the network;

wherein expression forms of the plural icons and link lines are changed to display the status.

* * * * *